J. W. TRAFTON.
Self-Closing Faucet.
No. 159,478. Patented Feb. 2, 1875.
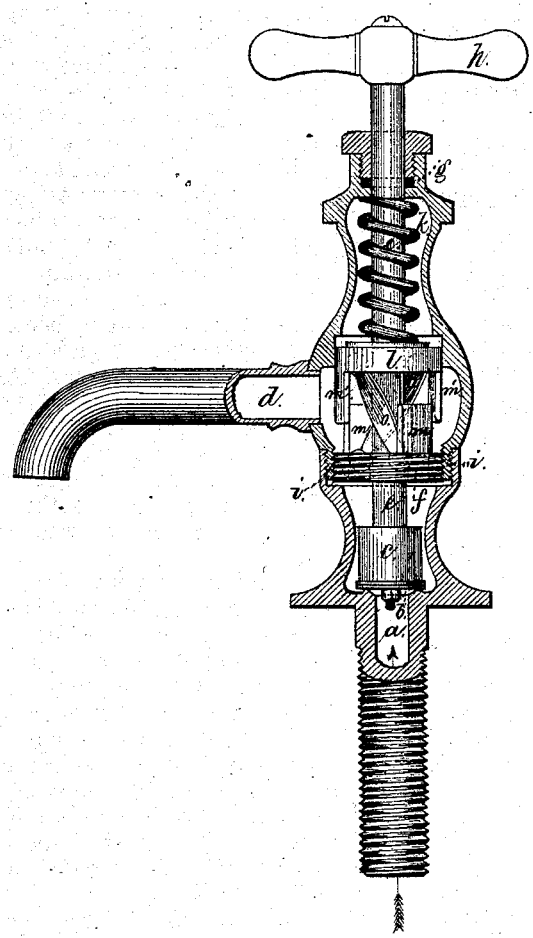
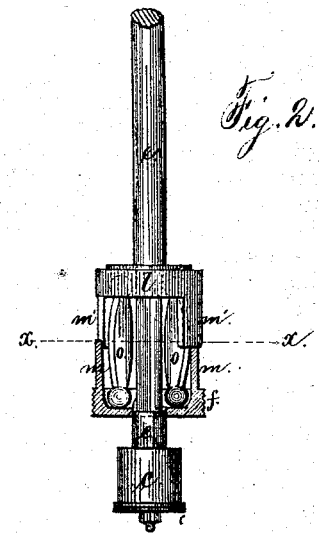

UNITED STATES PATENT OFFICE.

JOHN W. TRAFTON, OF SPRINGFIELD, MASSACHUSETTS.

IMPROVEMENT IN SELF-CLOSING FAUCETS.

Specification forming part of Letters Patent No. 159,478, dated February 2, 1875; application filed March 27, 1874.

*To all whom it may concern:*

Be it known that I, JOHN W. TRAFTON, of Springfield, in the State of Massachusetts, have invented an Improvement in Self-Closing Faucets, of which the following is a specification:

Faucets have been made with a spring to close a valve, either in the direction of the flow of water or against the pressure, and inclines have been employed for moving the valve against the action of the spring. In these instances there is considerable friction and wear, especially when the spring is adapted to heavy pressures. Faucets have been made with toggle-blocks inserted into recesses upon the cap of the barrel, and acting against an abutment surrounding the valve-spindle, so that when the stem and abutment are turned the toggle-blocks are turned up cornerwise and lift the abutment, stem, and valve; and stops have been used in this character of valve to prevent the spindle and toggles turning so far that the valve will remain open.

My invention is made for introducing the toggle-bars within the barrel of the faucet, where they will be lubricated by the liquid running through the cock.

In the drawing, Figure 1 is a vertical section of the body of the cock and an elevation of the interior parts. Fig. 2 is an elevation of the toggles and valve and section of the toggle-bed; and Fig. 3 is a sectional plan of the parts at the line $x\ x$.

The inlet-pipe $a$, valve-seat $b$, valve $c$, and discharge-pipe $d$, or bib, are of any desired character. The valve $c$ is, by preference, loose upon the end of the valve-rod $e$, and this rod $e$ passes freely through the toggle-base $f$ and gland or packing $g$, and terminates with a handle, $h$. The spring $k$ serves to close the valve upon its seat, and it presses upon the disk $l$, that is firmly connected to or made with the spindle or rod $e$. Upon the toggle-base $f$ there are projections $m$, and similar ones, $m'$, upon the disk $l$, and these, extending past each other, determine the amount of turning motion allowed to the valve-rod $e$. Between the base $f$ and disk $l$ are the rotary toggle-bars $o\ o$, that, by preference, are made with rounding ends that enter cavities in the respective faces of $f$ and $l$. The normal position of these toggle-bars $o\ o$ is inclined, as seen in Fig. 1, but when the valve-rod $e$ is partially turned these toggle-bars are brought into a position nearly parallel to the valve-rod, as in Fig. 2; hence the distance between $f$ and $l$ will be increased, and the valve lifted off its seat. If the extent of motion allowed by the projections $m$ and $m'$ were sufficient to carry the moving ends of the rotary toggle beyond the position parallel to the valve-rod, then the valve might remain open; but by making these stops $m$ and $m'$ so that the toggles do not reach the parallel position the valve is self-closing, and cannot become worn so as to stay open. The toggle and parts thereof being within the case they are lubricated by the liquid flowing through the cock, and they cannot be reached, and hence the self-closing faucet cannot be blocked open. The toggle-base $f$ is screwed into the barrel $i$ with holes for the water to pass through, and the body of the cock is screwed together near this point.

I claim as my invention—

1. The toggle-bars placed within the barrel of the cock or faucet between the valve and the gland $g$, so as to be lubricated by the liquid flowing through the cock, and acting between a fixed abutment or toggle-base and a bearing or disk upon the valve-stem, in combination with the valve-spring and valve-seat, substantially as set forth.

2. The projections $m$ and $m'$ upon the toggle-base $f$ and disk $l$, respectively, in combination with the toggle bars and valve, substantially as set forth.

3. The toggle-bars, made with globular ends and entering recesses in the toggle base and disk on the valve-stem, so as to allow the toggle-bars to turn in their bearings as the valve-stem is partially rotated in combination with the valve stem and spring, as specified.

Signed by me this 25th day of March, A. D. 1874.

JOHN W. TRAFTON.

Witnesses:
GEO. T. PINCKNEY,
CHAS. H. SMITH.